US 6,603,799 B1

(12) United States Patent
Hlasny (10) Patent No.: US 6,603,799 B1
(45) Date of Patent: Aug. 5, 2003

(54) METHOD FOR DETECTING THE HOPPING SEQUENCE OF AN INTERFERING WIRELESS SYSTEM

(75) Inventor: Daryl J. Hlasny, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 0 days.

(21) Appl. No.: 09/476,324

(22) Filed: Jan. 3, 2000

(51) Int. Cl.[7] .......................... H04B 15/00; H04K 1/00; H04C 27/30
(52) U.S. Cl. ....................................................... 375/132
(58) Field of Search ................................. 375/130, 132, 375/136, 133

(56) References Cited

U.S. PATENT DOCUMENTS 5,574,979 A   11/1996  West
6,275,518 B1 *  8/2001  Takahashi et al. ..........  375/135

OTHER PUBLICATIONS

Shared Wireless Access Protocol (Cordless Access) Specification—Oct. 1, 1999.

* cited by examiner

*Primary Examiner*—Jean B Corrielus
(74) *Attorney, Agent, or Firm*—Chernoff Vilhauer McClung & Stenzel, LLP (57) ABSTRACT

Knowledge of the frequency hopping patterns in use by co-located frequency hopping radio systems is useful in reducing the likelihood of collisions between potentially interfering systems. Detection of the frequency hopping pattern is accomplished by determining the time interval between transmissions at a plurality of frequencies by the interfering system and by correlating the time interval to a frequency hopping pattern used by the interferer. The system type of the potentially interfering system can be determined by timing the interval between successive transmissions at a single frequency and correlating this interval or hop pattern duration to a system identifier. Many frequency hopping radio systems can carry out these methods without additional hardware.

26 Claims, 5 Drawing Sheets

METHOD FOR DETECTING THE HOPPING SEQUENCE OF AN INTERFERING WIRELESS SYSTEM

BACKGROUND OF THE INVENTION

The present invention relates to a frequency hopping radio system and, more particularly, to a method for avoiding interference by co-located frequency hopping radio systems.

Spread spectrum is a communication technique originally developed to reduce eavesdropping and jamming of military radio communications. This resistance to eavesdropping and interference, both intentional and incidental, makes spread spectrum desirable for civilian uses, particularly when the communication channel is potentially crowded by a number of transmitters. One spread spectrum technique is frequency hopping where the transmission frequency is repeatedly changed during a transmission. Frequency hopping systems transmit over a substantial number of frequencies that are arranged into a relatively large number of frequency sequences or hopping patterns. For example, Federal Communications Commission (FCC) regulations in the United States (47 C.F.R. §15.247) require frequency hopping systems operating in the 2400–2483.5 MHZ band to use at least 75 different frequencies or channels with an average time of occupancy at any frequency (hop duration) not greater than 0.4 second within a 30 second period. Similar regulations constrain frequency hopping systems operating in other frequency bands and in other countries and geographical areas. The sequence of transmission frequencies used by a frequency hopping system is "pseudo random" in that it appears random to receivers other than an intended receiver which has knowledge of the hopping pattern and uses that knowledge to properly tune to each frequency used in the transmission. It is this property that produces the eavesdropping and interference resistance characteristics of a frequency hopping system.

Communications in the 2.4 GHz band (also known as the Instrument, Scientific, and Medical (ISM) band) is of particular interest because this frequency band has been designated for use by unlicenced, low power transmitters. A number of short range, frequency hopping, wireless communications systems have been designed that utilize the ISM band. One such communication system is known as the "HomeRF™" system. The HomeRF system is intended to allow personal computers, computer peripherals, cordless telephones, and almost all other consumer electronic devices to be designed to communicate and interact with each other over a HomeRF network. The HomeRF system will carry both voice and data communications within a typical residence and will connect to the public telephone system and the Internet for longer distance communication. The HomeRF system contemplates localization or design of particular systems to conform to local telecommunication regulations. For example, in the U.S. the HomeRF system hops 50 times per second on 75 channels with 1 MHZ separation between channels. The HomeRF system utilizes 75 hopping patterns each incorporating a unique sequence of the 75 transmission frequencies. Another wireless communication system for local area use is the Bluetooth system. Like the Home RF system, the Bluetooth system is intended to provide wireless networking of virtually all digital electronic devices. The Bluetooth system utilizes 79 different transmission frequencies and hops as many as 1600 hops per second.

While frequency hopping reduces the likelihood of interference by co-located systems, collisions between co-located radio systems and other emitters (such as microwave ovens) are inevitable. The HomeRF and Bluetooth systems are designed to tolerate collisions. Both systems incorporate error detection and provide for retransmission of corrupted data. With error detection and retransmission, the primary effect of interference is a reduction in data throughput. The magnitude of the throughput reduction is proportional to the total utilization of the communication channel and the relative hopping speeds of the interfering systems. Collisions between a co-located Bluetooth system and a HomeRF system can reduce the data throughput of the HomeRF system by as much as 20%.

The HomeRF and Bluetooth systems and other similar systems operating in the ISM band are generally incompatible and do not have the capability to detect or actively avoid collisions with other co-located systems. A wireless communication system could be designed to detect and decode the transmissions of potentially interfering systems. The information obtained could be used to determine the hopping pattern in use by the interfering system. Knowledge of the hopping pattern would permit the other co-located system to avoid transmitting on a particular frequency at a time when the interferer is using that frequency. However, incorporating in each communication system the capability to receive and decode transmissions of a number of other potentially interfering systems for the purpose of collision avoidance would be prohibitively complex and expensive.

What is desired therefore, is a resource efficient method for a wireless communication system to identify potentially interfering frequency hopping radio systems and to determine the hopping pattern in use by a potentially interfering system.

SUMMARY OF THE INVENTION

The present invention overcomes the aforementioned drawbacks of the prior art by providing a method for detecting a frequency hopping pattern of a radio transmitter comprising the steps of timing an interval between detection of a signal at a predetermined frequency and detection of a signal at another predetermined frequency, and correlating that interval to a frequency hopping pattern. The frequency hopping pattern in use by a HomeRF or similar system can be identified from the time interval between the system's transmission at different frequencies. Two time intervals separating transmission at three different frequencies are required to uniquely identify a hopping pattern from among the 75 hopping patterns used by the HomeRF system.

In addition, a method is disclosed for identifying a frequency hopping radio system comprising the steps of timing an interval between a first and a second transmission at a predetermined frequency, and correlating the interval to an identifier for the radio system. The hop sequence duration comprises the product of the duration of a hop and the number hops in a hopping pattern or sequence and is likely to be unique for each system. Timing the interval between successive transmissions at a particular frequency determines the hop sequence duration which can correlated to one of several system identifiers.

Using the methods of the invention, a system can be identified and its hop pattern determined without having knowledge of the contents of the transmissions of potentially interfering systems. Many wireless communication systems have the capability of performing these methods without additional hardware.

The foregoing and other objectives, features and advantages of the invention will be more readily understood upon consideration of the following detailed description of the invention, taken in conjunction with the accompanying drawings.

DETAILED DESCRIPTION OF THE PREFERRED EMBODIMENT

Figure 1:
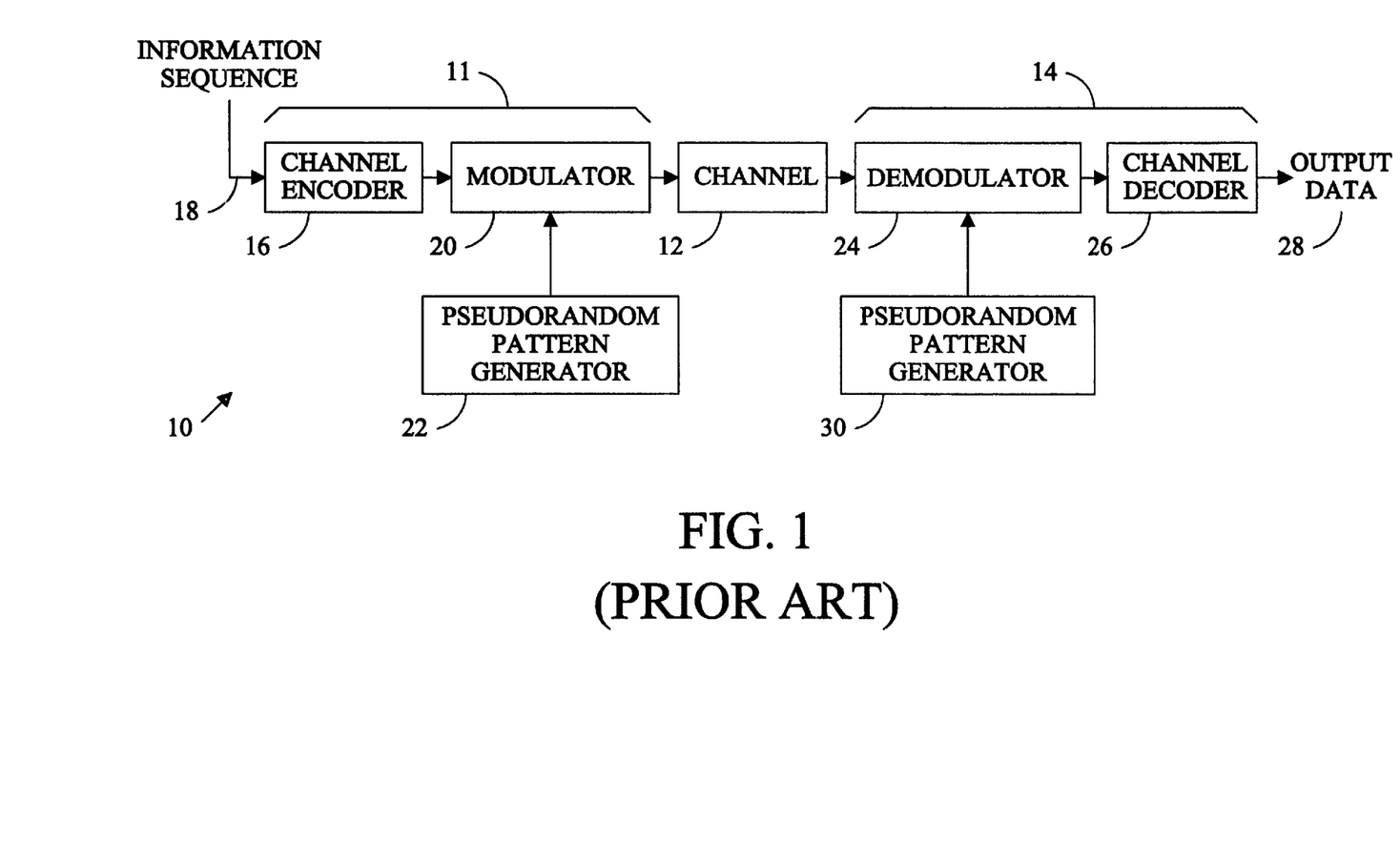
FIG. 1 is a block diagram of a frequency hopping communication system.

Referring to FIG. 1, an exemplary frequency hopping (FH) wireless communication system 10 comprises a transmitter 11 (indicated by a bracket), a communication channel 12, and a receiver 14 (indicated by a bracket). The transmitter 11 comprises a channel encoder 16 to encode the input information sequence 18, a modulator 20 to use the encoded information to modulate an emitted signal, and a "pseudo random" pattern generator 22. The receiver 14 comprises a demodulator 24, a channel decoder 26 to decode the output data 28, and a pseudo random pattern generator 30 identical to the generator 22 of the transmitter 11. The pattern generators 22 and 30 produce a "pseudo random" sequence of transmission frequencies or a hopping pattern. While transmitting, the system will periodically shift transmission frequencies according to the hopping pattern. A receiver 14 that is part of the system 10 uses the hopping pattern to tune to the proper frequencies as the transmitter 11 sequences through the hopping pattern. However, other receivers that are not part of the system 10 see the sequence of frequencies of the hopping pattern as random because the hopping pattern contains a substantial number of frequencies and the frequency sequence is only one of many sequences that the transmitter 11 can generate. One such frequency hopping communication system is the HomeRF™ system defined by the SHARED WIRELESS ACCESS PROTOCOL (CORDLESS ACCESS) SPECIFICATION (SWAP-CA), revision 1.2, The HomeRF Technical Committee, Oct. 1, 1999, incorporated by reference herein.

Figure 2:
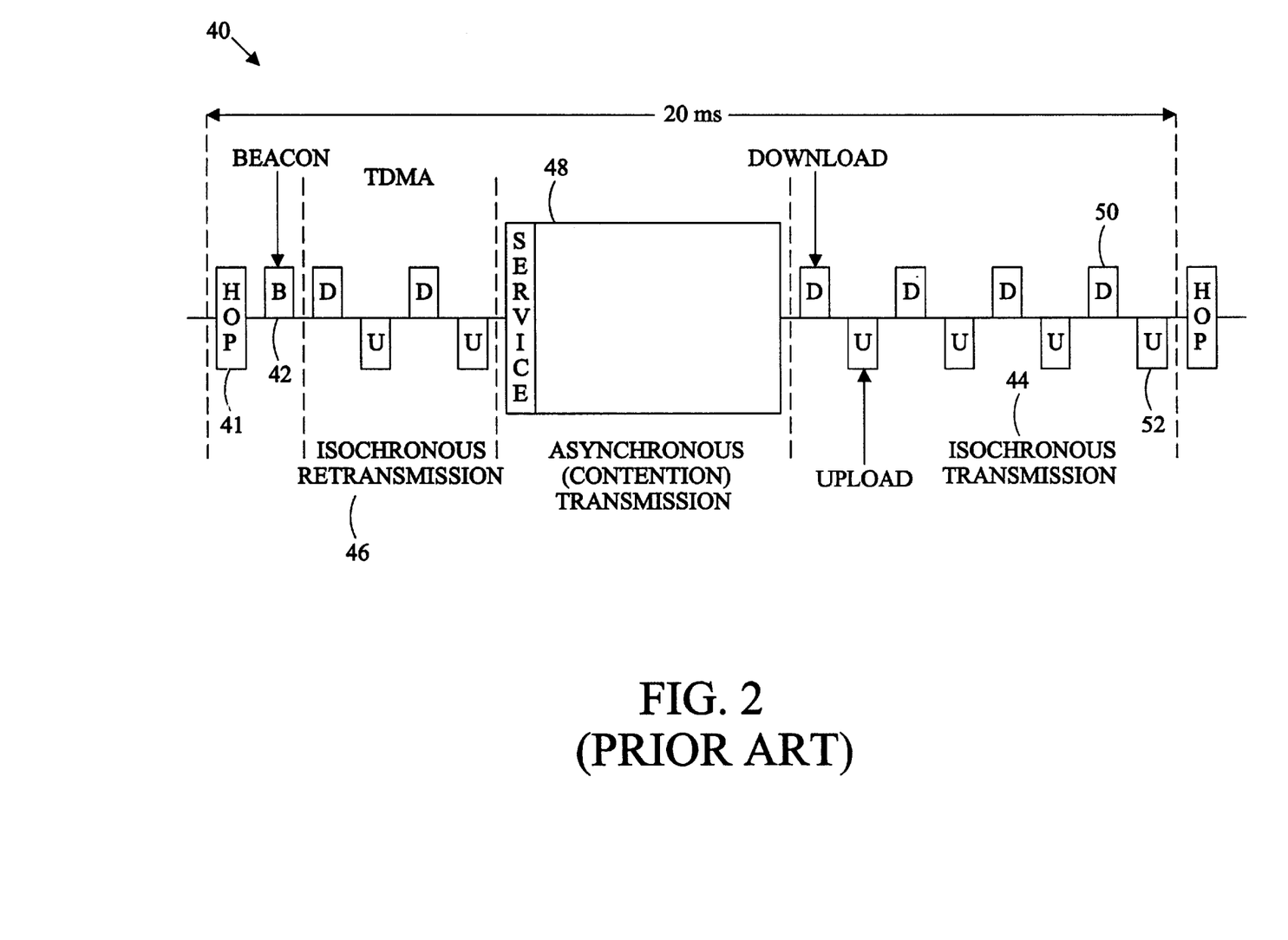
FIG. 2 is a diagram of the arrangement of the transmission time of a superframe of a HomeRF system.
Figure 3:
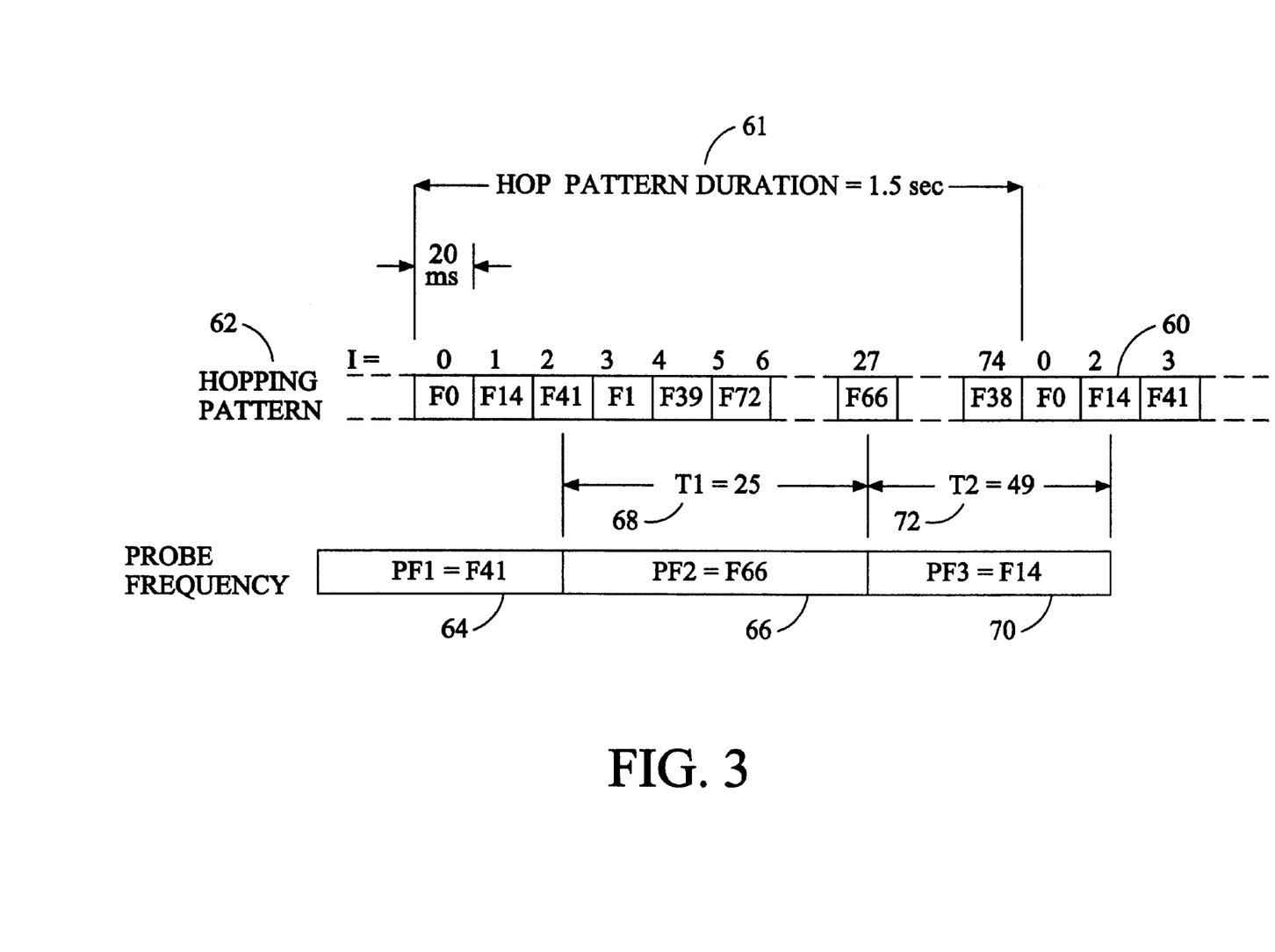
FIG. 3 is a diagram of an exemplary probing by the method of the present invention of a system operating with an exemplary hopping pattern.

Referring to FIG. 2, the transmission time of a HomeRF system is divided into a succession of superframes 40. Each superframe 40 is transmitted at a single frequency or slot in the transmission. At the end of a superframe 40, the system switches to the next frequency in the hopping pattern for transmission of the next superframe 40. Referring to FIG. 3, the HomeRF system utilizes 75 channels or transmission frequencies 60 separated from each other by 1 MHZ. In FIG. 3, each channel or slot 60 in the exemplary hopping pattern 62 is designated by a frequency index (F0, F14, etc.). The HomeRF system uses 75 unique channel sequences or hopping patterns 62 containing one occurrence of each of the 75 channels 60. The system transmits on each channel 60 for 20 milliseconds. The total duration of each hop pattern 62 is 1.5 seconds (the duration of the transmission at each frequency or hop multiplied by the number of hops in the hop pattern).

At the initiation of a HomeRF communication network, the system controller (known as the control point or CP) randomly selects a HopPattern variable between 0 and 74. A base hopping sequence (b(I)) correlated to the HopPattern variable is determined from a table in the SHARED WIRELESS ACCESS PROTOCOL (CORDLESS ACCESS) SPECIFICATION (SWAP-CA). The sequence of frequencies or hopping pattern 62 is generated by the pattern generator 22 or 30 according to the following equation:

$$Fx(I) = (b(I) + \text{HopPattern}) \bmod 75$$

where:

Fx(I) is the channel at time interval I b(I) is the Base Hopping sequence from the SHARED WIRELESS ACCESS PROTOCOL (SWAP-CA) specification I is the HopIndex which is incremented by 1 for each hop HopPattern is a randomly selected variable in the range 0 . . . 74.

To participate in a network, a HomeRF device must obtain the network identification (NWID) which includes the HopPattern variable in use by the system. With knowledge of the HopPattern variable the pattern generator 22 or 30 of a device participating in the network can generate the appropriate hopping pattern 62 for communication with the network.

Referring again to FIG. 2, each HomeRF superframe 40 comprises time periods for hopping 41, transmission of a beacon 42, isochronous (contention-free) data transmission 44, isochronous data retransmission 46, and asynchronous (contention) data transmission 48. The isochronous data transmission is a time division multiple access communication and is normally used for voice communication. Data is normally transmitted asynchronously. The HomeRF system is a time duplex system and each superframe 40 comprises download 50 and upload periods 52 for isochronous data. Likewise, asynchronous data can be uploaded and downloaded during the contention period 48. The isochronous 46 and asynchronous data 48 sections of any superframe 40 may be empty if there is no data of that type to be transmitted. The beacon 42 is a periodically transmitted signal used to maintain synchronization of the system. The beacon 42 is transmitted with every superframe 40 even if the superframe 40 contains no data.

The present inventor came to the realization that a HomeRF system or a similar system and the hopping pattern in use by system can be identified from the time interval between transmissions at predetermined frequencies without the need to join the network for the purpose of obtaining the network identification and decoding the hopping pattern identification data. To identify the hopping pattern in use by a potential interferer, a system need only monitor the interferer's transmissions and time the intervals between transmissions at a limited number of frequencies. Most wireless communication systems have this capability without additional hardware.

Figure 5:
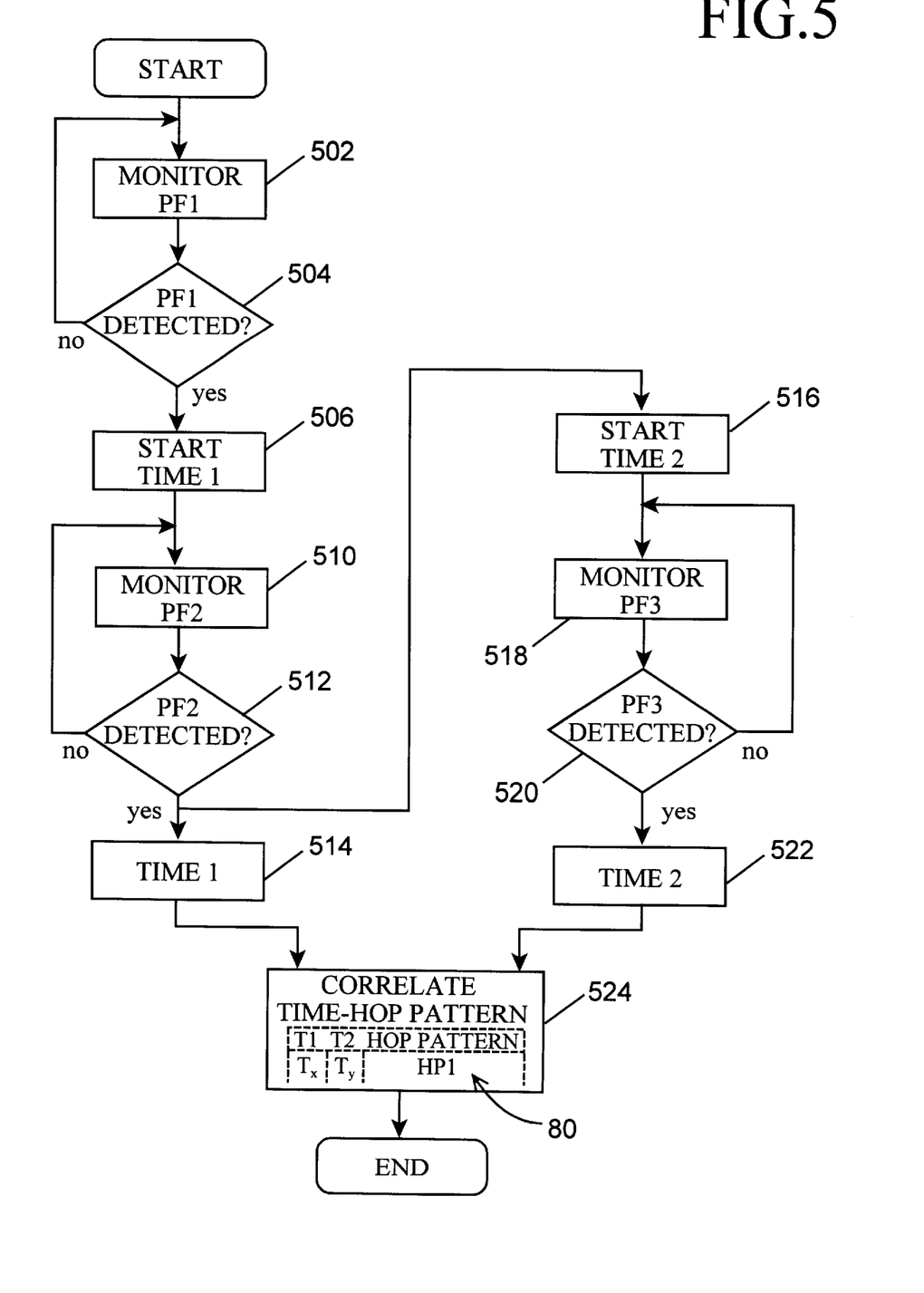
FIG. 5 is a diagram of steps in a method of detecting a frequency hopping pattern of a spread spectrum transmission.

Referring to FIGS. 3 and 5, to determine the hopping pattern of a potentially interfering HomeRF system, a device will tune its receiver to a first, predetermined probe frequency (PF1) 64 and monitor the frequency (F41) 502 until the beacon 42 in a superframe 40 or another periodically occurring signal is detected 504. When a signal at the first probe frequency (PF1) 64 is detected 504 a timer is started 506 and the receiver is tuned to a second predetermined probe frequency (PF2) 510. Timing can be initiated when the received signal strength (RSSI) at the probe frequency reaches a threshold level. Likewise, timing could be based on detection of a threshold value of a data characteristic of the signal other than signal strength such as the occurrence of a frequency sequence. When a signal at the second probe frequency 66 is detected 512, the first time interval (T1) 68 is noted 514 and timing of a second interval (T2) 72 is initiated 516. The receiver 14 is tuned to a third, predetermined probe frequency (PF3) 70 and monitors that frequency 518 until the signal of the interferer is detected at that frequency 520. When a signal is detected 520 at the third probe frequency (PF3) 70, the second time interval (T2) 72 is noted 522. The time intervals (T1) 68 and (T2) 72 are specified in numbers of hops in FIG.3.

Figure 4:
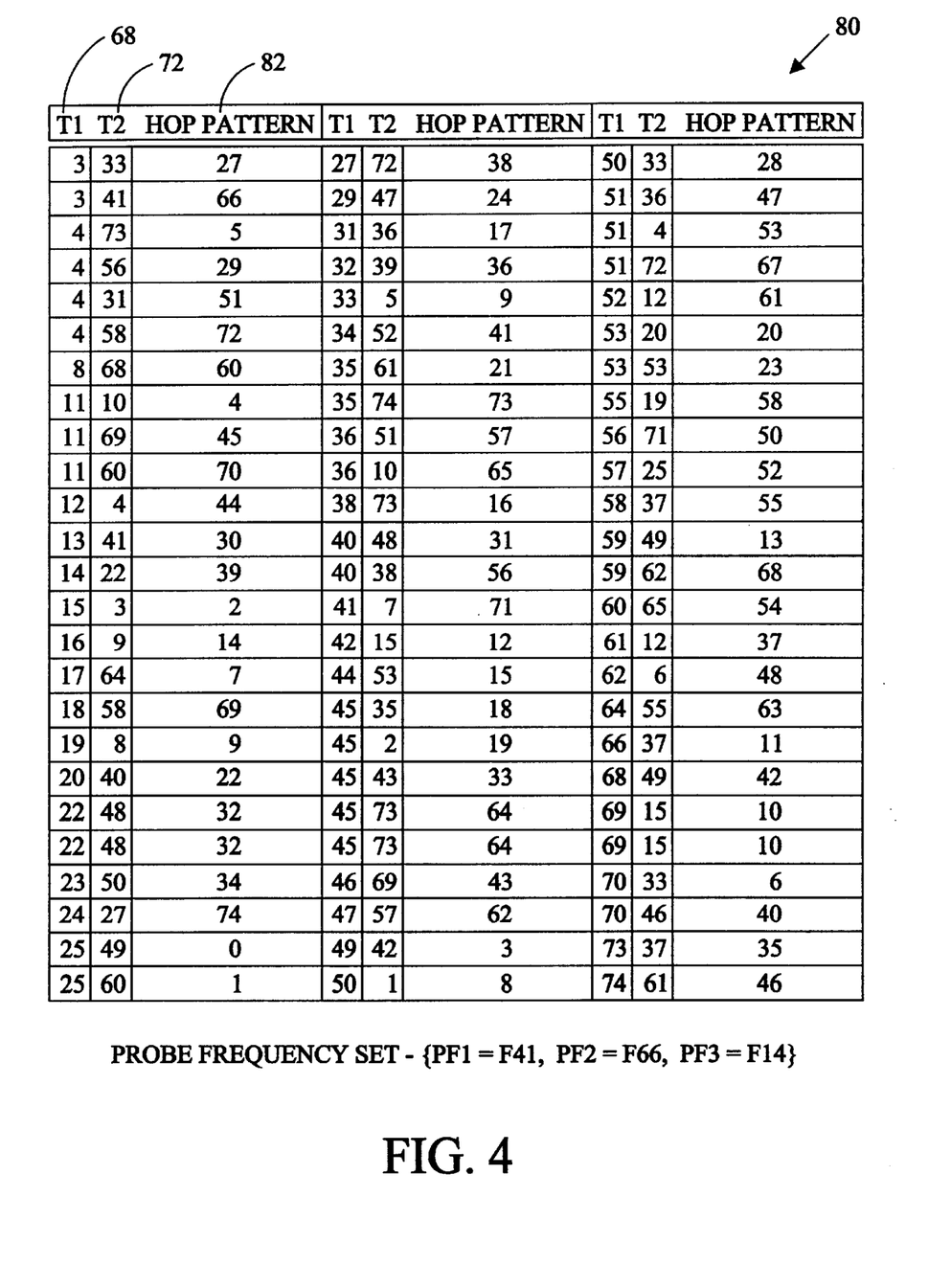
FIG. 4 is an exemplary table illustrating correlation of a HomeRF system's HopPattern variable and the intervals between transmissions at three probe frequencies.

Referring to FIG. 4, the time intervals (T1) 68 and (T2) 72 obtained by probing are used to access a table 80 correlating the first (T1) 68 and second (T2) 72 time interval values with the HopPattern variable 82 that establishes the hop pattern in use by a HomeRF system 524. For the example illustrated in FIG. 3, where T1 equals 25 hops and T2 equals 49 hops, the HopPattern 82 identified in the table 80 is HopPattern "0." Three probe frequencies (two time intervals) are required to uniquely identify the 75 hopping patterns of the HomeRF system. A two frequency probe (one time interval) will uniquely identify 37 of the hopping patterns and may be sufficient to identify the hopping patterns of other systems. On the other hand, the frequency pair (PF1 and PF2) that yields the greatest number of unique time intervals (T1) can determined from the equation:

$$PF1=n$$

$$PF2=(PF1+25) \bmod 75$$

for n=0 . . . 74

The three frequency set (PF1, PF2, PF3) may include these optimum probe frequencies, but this is not necessary. It is sufficient that a set of three probe frequencies be chosen such that a unique relationship exists between the hopping pattern and the pair of time intervals (T1, T2). The set of probe frequencies to produce this relationship can be chosen by trial and error.

The hop pattern of a potentially interfering system can be determined with the method of the present invention even if a transmission at a probe frequency is missed. If a transmission at a probe frequency is missed, the probing system can continue to monitor the probe frequency until the potentially interfering system transmits at that frequency. Since a transmission was missed at the normal time slot in the hopping pattern, the measured time interval would exceed the range of interval values (T1 or T2) 68 or 72 in the table 80. However, the remainder produced when the measured time interval is divided by the number of slots in the hop pattern constitutes a time interval modulus that is within the range of time interval values 68 or 72 in the table 80. The time interval modulus may be compared to the interval values in the table 80 for the purpose of identifying a hop pattern 82. For example, a modulo 75 operation can be used with a Home RF system to bring the measured time interval into the range of the interval values 68 or 72 in the table 80. With the HopPattern 82 determined and the phase of the sequence known from the frequency probing, future use of the spectrum by the HomeRF system can be predicted and interfering transmissions can be avoided.

The type of interfering system can be identified by probing a single frequency for successive transmissions at that frequency. The time interval between successive transmissions at one frequency identifies the hop pattern duration 61 which is likely to be unique to a particular type of system. The interfering system can be identified by comparing the measured hop pattern duration 61 to values in table correlating the durations of hop patterns to identifiers for various systems. This method can be used to pre-screen potential interferers to determine if the interfering system is a HomeRF system or another type of system before attempting to identify the hopping pattern in use. Likewise, this method can be used to detect multiple interfering systems of the same type.

All the references cited herein are incorporated by reference.

The terms and expressions that have been employed in the foregoing specification are used as terms of description and not of limitation, and there is no intention, in the use of such terms and expressions, of excluding equivalents of the features shown and described or portions thereof, it being recognized that the scope of the invention is defined and limited only by the claims that follow.

What is claimed is:

1. A method of detecting a frequency hopping pattern of a spread spectrum transmission, said spread spectrum transmission comprising a succession of signals, each transmitted for a period of time at a frequency included in a frequency slot, said frequency hopping pattern being one of a plurality of sequences of said frequency slots, said method comprising the steps of:

(a) timing a detection interval between detection of a first signal at a first frequency and detection of a second signal at a second frequency; and (b) correlating said detection interval to a transmission interval for a frequency hopping pattern, said transmission interval being an interval between a transmission in a first frequency slot, said first frequency slot including said first frequency and another transmission in a second frequency slot, said second frequency slot including said second frequency.

2. The method of claim 1 wherein the step of timing said detection interval comprises the steps of:

(a) monitoring a characteristic of said first signal;

(b) initiating said timing of said detection interval when said characteristic of said first signal reaches at least a threshold value;

(c) monitoring a characteristic of said second signal; and (d) terminating said timing of said detection interval when said signal characteristic of said second signal reaches at least said threshold value.

3. The method of claim 2 wherein said characteristic of said first signal and said second signal comprises a signal strength.

4. The method of claim 1 wherein the step of correlating said detection interval to said transmission interval for a frequency hopping pattern comprises the step of comparing said detection interval to a transmission interval for each of a plurality of frequency hopping patterns.

5. The method of claim 1 wherein at least one of said first signal and said second signal comprises a periodically transmitted beacon.

6. A method of detecting a frequency hopping pattern of a spread spectrum transmission, said spread spectrum transmission comprising a succession of signals, each transmitted for a period of time at a frequency included in a frequency slot, said frequency hopping pattern being one of a plurality of sequences of said frequency slots, said method comprising the steps of:

(a) timing a first detection interval between detection of a first signal at a first frequency and detection of a second signal at a second frequency;

(b) timing a second detection interval between detection of said second signal and detection of a third signal at a third frequency; and (c) correlating said first detection interval to a first transmission interval of said frequency hopping pattern, said first transmission interval being an interval between a transmission in a first frequency slot including said first frequency and another transmission in a second frequency slot including said second frequency, and (d) correlating said second detection interval to a second transmission interval of said frequency hopping pattern, said second transmission interval being an interval between said another transmission and still another a transmission in a third frequency slot including said third frequency.

7. The method of claim 6 wherein the step of timing said first detection interval comprises the steps of:

(a) monitoring a characteristic of said first signal;
(b) initiating said timing of said first detection interval when said characteristic of said first signal reaches at least a threshold value;
(c) monitoring a characteristic of said second signal; and
(d) terminating said timing of said first detection interval when said signal characteristic of said second signal reaches at least said threshold value.

8. The method of claim 7 wherein said characteristics of said first signal and said second signal comprise a signal strength.

9. The method of claim 6 wherein the step of timing said second detection interval comprises the steps of:

(a) monitoring a characteristic of said second signal;
(b) initiating said timing of said second detection interval when said characteristic of said second signal reaches at least threshold value;
(c) monitoring a characteristic of said third signal; and
(d) terminating said timing of said second detection interval when said characteristic of said third signal reaches at least said threshold value.

10. The method of claim 9 wherein said characteristics of said second signal and said third signal comprise a signal strength.

11. The method of claim 6 wherein the step of correlating said first detection interval to said first transmission interval of a frequency hopping pattern and said second detection interval to said second transmission interval of said frequency hopping pattern comprises the steps of:

(a) comparing said first detection interval to a first transmission interval for each of a plurality of frequency hopping patterns; and
(b) comparing said second detection interval to a second transmission interval for each frequency hopping pattern having a first transmission interval substantially equaling said first detection interval.

12. The method of claim 6 wherein at least one of said first signal, said second signal, and said third signal comprises a periodically transmitted beacon.

13. A method of detecting a frequency hopping pattern of a spread spectrum transmission, said spread spectrum transmission comprising a sequence of signals, each transmitted for a period of time at a frequency included in a frequency slot, said frequency hopping pattern being one of a plurality of sequences of said frequency slots, said method comprising the steps of:

(a) timing a detection interval between detection of a first signal at a first predetermined frequency and detection of a second signal at a second predetermined frequency;

(b) determining a detection interval modulus as a function of said detection interval and a number of frequency slots in said frequency hopping pattern; and (c) correlating said detection interval modulus to a transmission interval of said frequency hopping pattern, said transmission interval being an interval between a transmission at a first frequency slot, said first frequency slot including said first predetermined frequency, and another transmission at a second frequency slot, said second frequency slot including said second predetermined frequency.

14. The method of claim 13 wherein the step of timing said detection interval comprises the steps of:

(a) monitoring a characteristic of said first signal;
(b) initiating said timing of said detection interval when said characteristic of said first signal reaches at least a threshold value;
(c) monitoring a characteristic of said second signal; and
(d) terminating said timing of said detection interval when said characteristic of said second signal reaches at least said threshold value.

15. The method of claim 14 wherein said characteristic of said first signal comprises a signal strength.

16. The method of claim 13 further comprising the steps of:

(a) timing another detection interval between detection of said second signal and detection of a third signal at a third predetermined frequency;
(b) determining another detection interval modulus as a function of said another detection interval and said number of frequency slots in said frequency hopping pattern; and
(c) correlating said another detection interval modulus to another transmission interval of said frequency hopping pattern, said another transmission interval being an interval between said another transmission and still another transmission at a third frequency slot, said third frequency slot including said third predetermined frequency.

17. The method of claim 16 wherein said characteristic of said second signal comprises a signal strength.

18. The method of claim 13 wherein the step of correlating said detection interval modulus to said transmission interval for a hopping pattern comprises the step of comparing said detection interval modulus to a transmission interval for at least one of a plurality of frequency hopping patterns.

19. A method of identifying a frequency hopping pattern of a spread spectrum transmission, said spread spectrum transmission comprising a plurality of signals each occurring at a signal frequency in one of a plurality of frequency slots, said frequency hopping pattern being a repeatable sequence of said frequency slots, said method comprising the steps of:

(a) timing an interval between detection of a first occurrence and a second occurrence of a signal at a signal frequency; and
(b) correlating said interval to a transmission interval for a frequency hopping pattern, said transmission interval being a time between a transmission in a frequency slot and a next transmission in said frequency slot for said frequency hopping pattern.

20. The method of claim 19 wherein the step of timing said interval between said first and second occurrences of said signal comprises the steps of:

(a) monitoring a signal characteristic at said frequency;

(b) initiating said timing of said interval upon said signal characteristic reaching at least a threshold value; and (c) terminating said timing of said interval upon said signal characteristic reaching at least said threshold value during said second occurrence of said signal.

21. The method of claim 20 wherein said signal characteristic comprises a signal strength.

22. The method of claim 19 wherein the step of correlating said interval between detected occurrences of said signal to a transmission interval between a transmission and a next transmission in a frequency slot comprises the step of comparing said interval between detected occurrences of said signal to a transmission interval value for each of a plurality of frequency hopping patterns.

23. The method of claim 19 wherein said signal comprises a periodically transmitted timing signal.

24. A method of detecting a frequency hopping pattern of a radio transmission, said radio transmission comprising a succession of periodic transmissions, each occurring at a frequency within a frequency slot, and said frequency hopping pattern comprises one of a plurality of sequences of said frequency slots, said method comprising the steps of:

(a) monitoring a signal strength at a first predetermined frequency;

(b) initiating timing of a first interval when said signal strength at said first predetermined frequency reaches at least a threshold strength;

(c) monitoring said signal strength at a second predetermined frequency;

(d) terminating said timing of said first interval and initiating timing of a second interval when said signal strength at said second predetermined frequency reaches at least said threshold strength;

(e) monitoring said signal strength at a third predetermined frequency;

(f) terminating said timing of said second interval when said signal strength at said third predetermined frequency reaches at least said threshold strength;

(g) comparing said first interval to a first transmission interval specifying a time between a transmission at said first predetermined frequency and a transmission at said second predetermined frequency for a plurality of frequency hopping patterns;

(h) comparing said second interval to a second transmission interval specifying a time between a transmission at said second predetermined frequency and a transmission at said third predetermined frequency for at least one of said plurality of frequency hopping patterns; and (i) identifying as said frequency hopping pattern of said radio transmission, said frequency hopping pattern having first and second transmission intervals substantially equaling, respectively, said first and second intervals.

25. The method of claim 24 wherein said radio transmission includes a periodically transmitted beacon.

26. The method of claim 25 wherein said beacon comprises a timing signal.

\* \* \* \* \*

UNITED STATES PATENT AND TRADEMARK OFFICE
CERTIFICATE OF CORRECTION

| | |
|---|---|
| PATENT NO. | : 6,603,799 B1 |
| APPLICATION NO. | : 09/476324 |
| DATED | : January 3, 2000 |
| INVENTOR(S) | : Daryl J. Hlasny |

It is certified that error appears in the above-identified patent and that said Letters Patent is hereby corrected as shown below:

<u>Column 2, line 58</u>
Change "which can correlated" to --which can be correlated--

<u>Column 5, line 27 & 28</u>
Change "can determined" to --can be determined--

Signed and Sealed this

Fifth Day of June, 2007

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 6,603,799 B1 | Page 1 of 1 |
| APPLICATION NO. | : 09/476324 | |
| DATED | : August 5, 2003 | |
| INVENTOR(S) | : Daryl J. Hlasny | |

It is certified that error appears in the above-identified patent and that said Letters Patent is hereby corrected as shown below:

<u>Column 2, line 58</u>
Change "which can correlated" to --which can be correlated--

<u>Column 5, line 27 & 28</u>
Change "can determined" to --can be determined--

This certificate supersedes Certificate of Correction issued June 5, 2007.

Signed and Sealed this

Tenth Day of July, 2007

JON W. DUDAS
*Director of the United States Patent and Trademark Office*